US006058033A

United States Patent [19]

Williams et al.

[11] Patent Number: 6,058,033

[45] Date of Patent: May 2, 2000

[54] VOLTAGE TO CURRENT CONVERTER WITH MINIMAL NOISE SENSITIVITY

[75] Inventors: Stephen T. Williams, Laurel; Eric Naviasky, Ellicott City; Michael Hufford, Catonsville; Timothy Henricks, Marriottsville, all of Md.

[73] Assignee: Cadence Design Systems, Inc., San Jose, Calif.

[21] Appl. No.: 09/169,304

[22] Filed: Oct. 8, 1998

[51] Int. Cl.[7] .............................. H02M 7/00; G05F 3/16; G05F 3/04

[52] U.S. Cl. ............................ 363/73; 323/315; 323/313; 323/300

[58] Field of Search ............................... 363/73; 323/315, 323/313, 300

[56] References Cited

U.S. PATENT DOCUMENTS

| | | | |
|---|---|---|---|
| 5,459,653 | 10/1995 | Seto et al. | 363/73 |
| 5,619,125 | 4/1997 | Lakshmikumar | 363/73 |
| 5,754,039 | 5/1998 | Nishimura | 363/73 |
| 5,815,390 | 9/1998 | Lakshmikumar | 363/73 |

*Primary Examiner*—Peter S. Wong
*Assistant Examiner*—Bao Q. Vu
*Attorney, Agent, or Firm*—Sabath & Truong; Bobby K. Truong

[57] ABSTRACT

A voltage to current (V-I) converter includes a low pass filter, a first converting element, a second converting element, and an output. The low pass filter receives an input voltage signal and outputs a filtered voltage signal. The output of the low pass filter is fed to the first converting element, which converts the filtered voltage signal into a corresponding output current which is fed to the output of the V-I converter. Preferably, the voltage to current gain of the first converting element is high. The low pass filter and the first converting element form a low frequency or DC signal path. The V-I converter further includes a second converting element, which receives the input voltage signal and converts it into a corresponding output current which is also fed to the output of the V-I converter. This current is combined with the output current from the first converting element to produce an overall output current. Preferably, the second converting element has a substantially flat frequency response and a low voltage to current gain relative to the voltage to current gain of the first converting element. The second converting element forms the high frequency or alternating current (AC) signal path. By implementing a high gain on the low frequency path and a low gain on the high frequency path, the high frequency noise components are insignificant relative to the low frequency components. Thus, a relatively mall input voltage range is converted into a relatively large output current range without suffering increased sensitivity to noise.

18 Claims, 9 Drawing Sheets

VOLTAGE TO CURRENT CONVERTER WITH MINIMAL NOISE SENSITIVITY

FIELD OF THE INVENTION

This invention relates generally to electronic circuits and more particularly to a voltage to current converter which converts a relatively small input voltage range into a relatively large output current range with minimal noise sensitivity.

BACKGROUND OF THE INVENTION

In electronic device implementations, it is often necessary to transfer information synchronously between different components. Such a situation may arise, for example, when transferring data between several chips or between several blocks on a chip. Because each component typically runs off of its own internal clock signal, synchronous information transfer is usually achieved by providing a reference clock signal to each of the components and then having each of the components synchronize its internal clock signal with the reference clock signal. Once synchronization is achieved, the components perform the information transfer using their own internal clock signals.

To synchronize a component's internal clock signal with a reference clock signal, a phase lock loop (PLL) is often used. A typical PLL is shown in FIG. 1, wherein the PLL 110 comprises a phase frequency detector (PFD) 112, a charge pump 114, a loop filter 116, and a voltage controlled oscillator (VCO) 118. The internally generated clock signal DCLK and the reference clock signal RCLK are fed as inputs to the PFD 112. The function of the PFD 112 is to detect the difference in phase and frequency between the two clock signals, and to generate output control signals UP and DOWN indicative of the phase and frequency differences. These control signals UP, DOWN are then fed as inputs to the charge pump 114. In response, the charge pump 114 generates a net current in accordance with the input control signals UP, DOWN, to either charge or discharge the loop filter 116 to a particular voltage. It is the voltage on loop filter 116 that controls the frequency of the DCLK generated by VCO 118. Preferably, the voltage present at the input of the VCO 118 is such that it causes the VCO 118 to generate a new DCLK signal having a frequency and phase closer to that of the reference signal RCLK- In this manner, the PLL 110 "pushes" DCLK towards RCLK.

Once the new DCLK is generated, it is fed back to the input of the PFD 112 along with RCLK, and the process is repeated Because of the feedback loop, this adjustment process continues until ideally DCLK "locks on" to RCLK in both phase and frequency. If a true lock is achieved, the PFD 112 will generate substantially identical UP and DOWN control signals (i.e. signals having substantially identical pulse widths) to indicate that there is no phase or frequency difference between the DCLK and RCLK signals. In some implementations, it is desirable for DCLK to have a frequency that is a multiple of the RCLK frequency. In such implementations, a modulo n feedback counter 120 is inserted into the feedback path as shown. If a counter 120 is used, a corresponding delay element 122 having the same delay as the counter is usually imposed between RCLK and the input of the PFD 112 to equalize signal delays.

In order for DCLK to properly lock on to RCLK, several conditions need to be met, one of which is that the charge pump needs to source and sink the same amount of current when the control signals UP, DOWN from the PFD 112 are substantially identical. Put another way, when the UP and DOWN control signals have substantially the same pulse widths, the charge pump should output a net current of substantially zero so that no further charge is injected into or removed from the loop filter, thereby maintaining the PLL 110 in locked condition. This is the ideal situation. However, because of the relatively wide range of voltages that can typically appear at the output of the charge pump 114, this ideal is very difficult to achieve.

To elaborate, there is shown in FIG. 2 a portion of a typical charge pump 114, comprising a current source 202, a current sink 216, a sourcing control 204, and a sinking control 210. The current source 202, which provides sourcing current to the output of the charge pump, is typically implemented by way of a PMOS transistor 203. The amount of sourcing current that is flowed from the current source 202 to the output of the charge pump is determined by the sourcing control 204. Typically, sourcing control 204 takes the form of a dual transistor switch comprising a first PMOS transistor 206 coupled between the current source 202 and ground, and a second PMOS transistor 208 coupled between current source 202 and the output of the charge pump. By selectively coupling the current source 202 either to ground or to the output of the charge pump in response to the control signals UP and UP' (UP' is the inverse of the UP control signal), sourcing control 204 determines the sourcing current that flows from current source 202 to the output of the charge pump.

Current sink 216 is the component in the charge pump that sinks current from the output of the charge pump. Current sink 216 is typically implemented as an NMOS transistor 217. The amount of sinking current that is flowed from the output of the charge pump to the current sink 216 is determined by the sinking control 210. Sinking control 210 is typically implemented as a dual transistor switch comprising a first NMOS transistor 212 coupled between a voltage source VDD and current sink 216, and a second NMOS transistor 214 coupled between the output of the charge pump and current sink 216. By selectively coupling the current sink 216 either to the voltage source VDD or to the output of the charge pump in response to the control signals DOWN and DOWN' (DOWN' is the inverse of the DOWN control signal), sinking control 210 determines the amount of sinking current that is flowed from the output of the charge pump to current sink 216.

The difference between the sourcing current and the sinking current is the net current that appears at the output of the charge pump. As mentioned above, when the UP and DOWN controls signals from the PFD 112 are substantially identical, the charge pump 114 should output a net current of substantially zero.

As shown in FIG. 1, the output of the charge pump 114 is fed to the loop filter 116 to charge or discharge the loop filter 116 to a particular voltage. The voltage at the loop filter 116 is then applied to the input of the VCO 118 to control the frequency of the DCLK signal generated by the VCO 118. Because the output of the charge pump 114 is coupled to the loop filter 116 which in turn is coupled to the input of the VCO 118, the output of the charge pump 114 is subjected to the same voltage range as that experienced by the input of the VCO 118. In a typical VCO, an input voltage range of 0.8 V to 2.4 V is needed to generate the necessary range of frequencies over manufacturing process, temperature, and power supply variations. With such a wide range of voltages at its output, it is difficult for the charge pump 114 to operate consistently for all possible voltages.

To illustrate this problem, suppose that a relatively low voltage (e.g. 1 V) is at the output of the charge pump 114.

At this voltage, the drain to source voltage (Vds) of the sink transistor 217 (FIG. 2) is affected more than the Vds of the source transistor 203. As a result, the sinking current is decreased relative to the sourcing current, causing a net increase in sourcing current. This is so despite the fact that none of the parameters or control signals have been changed. Now, suppose that a relatively high voltage (e.g. 2.2 V) is present at the output of the charge pump 114. At this voltage, the Vds of the source transistor 203 is affected more than the Vds of the sink transistor 217. Consequently, the sourcing current is decreased relative to the sinking current, causing a net increase in sinking current. Again, no parameters or control signals have been altered. As this discussion illustrates, the charge pump 114 behaves differently for different output voltages. This phenomenon is referred to charge pump excursion. The wider the range of voltages, the more difficult it becomes to get consistent performance from the charge pump 114.

There are several known solutions to this problem, each of which has its associated drawbacks. The first possible solution is to cascode the current source 202 and the current sink 216 to increase their impedance. The higher their impedance, the less affected they will be by the voltage at the output of the charge pump. This method is effective for equalizing the direct current (DC) components of the sourcing and sinking currents; however, it does not adequately control the transient current components. The transient currents can still be affected by the gate to drain capacitance (Cgd) (which in turn is affected by the Vds) of the switches 204, 210 that control the flow of current to and from the output of the charge pump. Thus, cascoding provides only a partial solution.

Another possible solution is to implement an active loop filter 116 and a reference voltage at the output of the charge pump 114. By doing this, the voltage range at the output of the charge pump 114 can be kept small while still providing the large voltage range that is needed at the input of the VCO 118. One such loop filter 300 is shown in FIG. 3, comprising an op-amp 302 having a parallel feedback loop. One branch of the feedback loop has a capacitor 304. The other branch has a resistor 306 connected in series with a capacitor 308. At the inputs, the op-amp receives the output from the charge pump 114 and a reference voltage Vref. This loop filter 300 is effective for shielding the charge pump 114 from the wide range of voltages that can appear at the input of the VCO 118. However, in order to be implemented, it requires capacitors that do not require a certain polarity, such as poly—poly capacitors. In many less expensive manufacturing processes where only n-well capacitors are available, such capacitors cannot be fabricated. In such situations, loop filter 300 is not a practicable solution.

Another possible solution is to increase the frequency to voltage gain (Δfrequency/ΔVoltage) of the VCO 118 so that a smaller voltage swing will produce the same frequency change. The drawback of this solution is that it renders the VCO 118 much more sensitive to noise, thereby making the output of the VCO 118 more erratic. As the above discussion shows, none of the currently known solutions are wholly satisfactory.

SUMMARY OF THE INVENTION

To overcome the shortcomings of the prior art, the present invention provides an improved voltage to current (V-I) converter which may be used to construct an improved voltage controlled oscillator (VCO). The V-I converter of the present invention generates output currents having a relatively large range of values based upon input voltage signals having a relatively small range of values. The V-I converter generates these output currents in such a way that they are only minimally affected by noise on the input voltage signals. Once generated, the currents from the V-I converter can be used to drive a current to frequency I-F) converter, such as a ring oscillator, to generate output signals having a range of frequencies. Together, the V-I converter and the I-F converter form a VCO. Such a VCO may be used in a variety of applications, including that of a PLL.

The V-I converter of the present invention is advantageous in at least several respects. First, it generates a wide range of output currents (which in turn enables the VCO to generate a wide range of frequencies) based upon a small range of input voltages. By requiring only a small input voltage range, the present invention reduces the range of voltages that need to appear at the output of the charge pump, thereby significantly reducing charge pump excursion. Also, the V-I converter generates output currents the values of which are only minimally affected by noise on the input signals. By doing so, the present invention minimizes the effect of noise on the control voltage of the VCO, thereby making the frequency output of the VCO more stable. In effect, the present invention makes it possible to increase the frequency to voltage (Δfrequency/ΔVoltage) gain of the VCO without increasing the VCO's sensitivity to noise.

In the preferred embodiment, the V-I converter comprises a low pass filter, a first converting element, a second converting element, and an output. The low pass filter receives an input voltage signal (e.g. the output of the charge pump and loop filter) and outputs a filtered signal. Preferably, the time constant of the filter is high so that only direct current (DC) and very low frequency signals are allowed to pass. In the preferred embodiment, the low pass filter takes the form of an active filter comprising a processing element having a low transconductance, and a capacitive element, which may be an n-well or other type of polarized capacitive element.

The output of the low pass filter is fed to the input of the first converting element. In response, the first converting element converts the filtered voltage signal into a corresponding output current which is fed to the output of the V-I converter. Preferably, the voltage to current gain of the first converting element is high so that even a small change in the low frequency component of the input voltage will cause a relatively large change in the low frequency component of the output current. Together, the low pass filter and the first converting element form a low frequency or DC signal path. Because only low frequency signals are allowed to pass through this path, only low frequency signals will benefit from the high voltage to current gain of the first converting element.

The V-I converter of the present invention further comprises a second converting element. The second converting element receives the input voltage signal (e.g. from the charge pump and loop filter) and converts it into a corresponding output current which is fed to the output of the V-I converter. This current is combined with the output current from the first converting element to produce an overall output current of the converter. Preferably, the second converting element has a substantially flat frequency response so that all relevant frequencies are allowed to pass. In addition, the second converting element preferably has a low voltage to current gain relative to the voltage to current gain of the first converting element so that currents generated by the second converting element are significantly smaller than currents generated by the first converting element. Because all relevant frequencies, including high frequencies, are allowed to pass through the second converting element, it forms the high frequency or alternating current (AC) signal path.

The rationale for having a high gain on the low frequency path and a low gain on the high frequency path is that such an arrangement minimizes the effects of noise on the V-I converter. This rationale is founded upon two bases. First, it is generally true that most noise components have high frequencies. By implementing a high gain on the low frequency path and a low gain on the high frequency path, the present invention makes the high frequency noise components insignificant relative to the low frequency components. Second, in a PLL, low frequency noise components are corrected for by the PLL loop gain. Thus, if the V-I converter of the present invention is implemented as part of a PLL, and if the input to the V-I converter has low frequency noise components, the low frequency noise components will have relatively little effect on the output of the converter since these components are corrected for by the PLL loop gain. This aspect off a PLL makes it possible to subject the low frequency components to a high voltage to current gain without suffering increased sensitivity to low frequency noise. Overall, the V-I converter of the present invention makes it possible to convert a relatively small input voltage range into a relatively large output current range without suffering increased sensitivity to noise.

DETAILED DESCRIPTION OF THE PREFERRED EMBODIMENTS

OVERVIEW

Figure 1A:
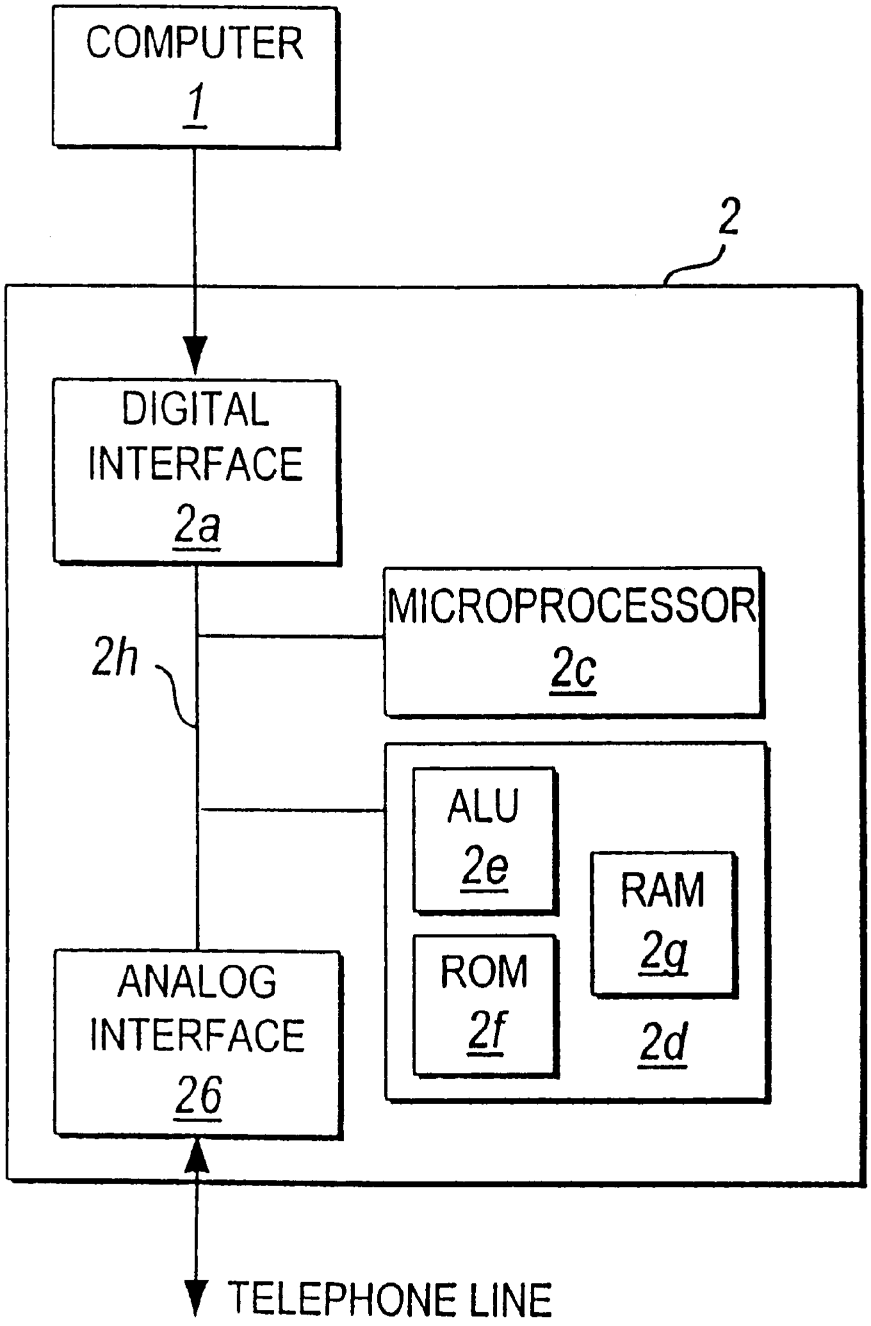
FIGURE 1A PRIOR ART
FIGS. 1A–B are a block diagram representations of a typical phase lock loop.
Figure 1B:
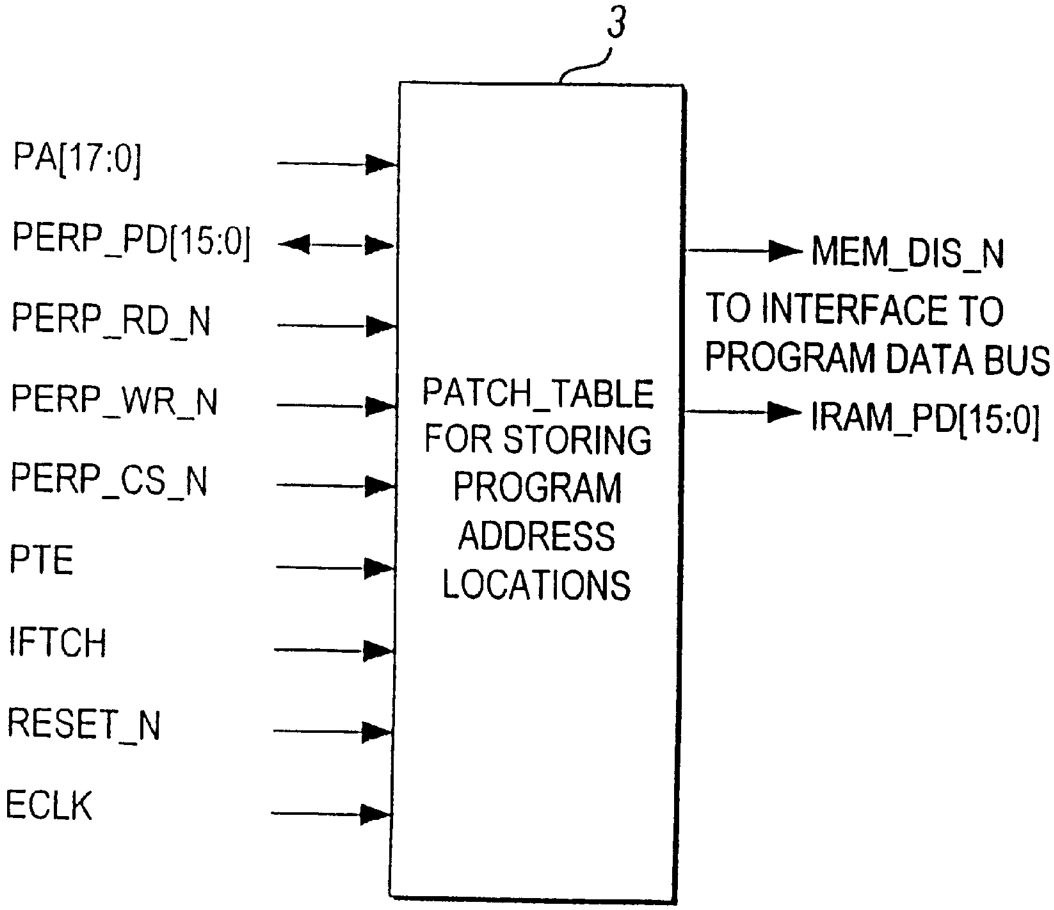
Figure 2:
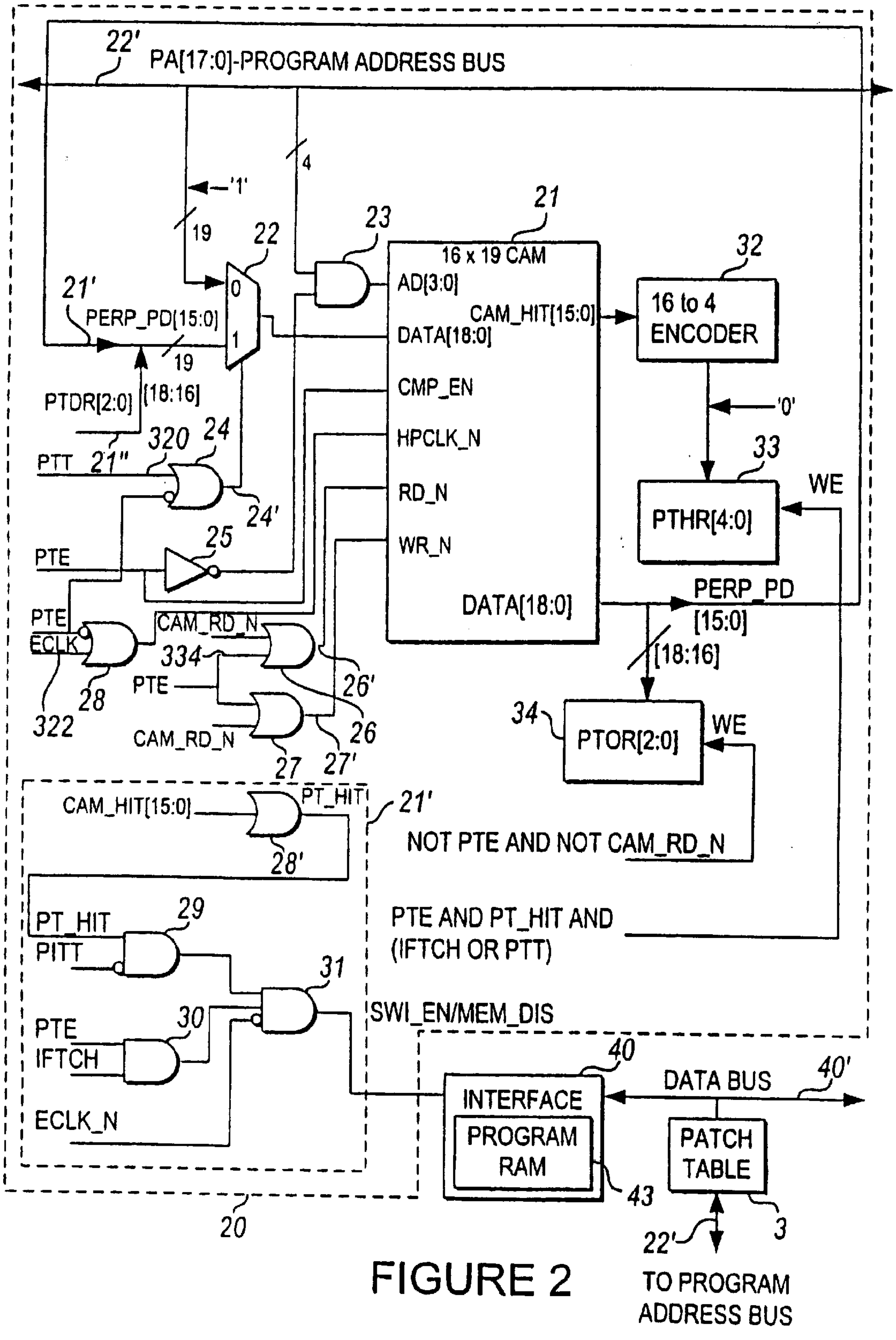
FIG. 2 is a circuit diagram of a portion of a typical charge pump.
Figure 3:
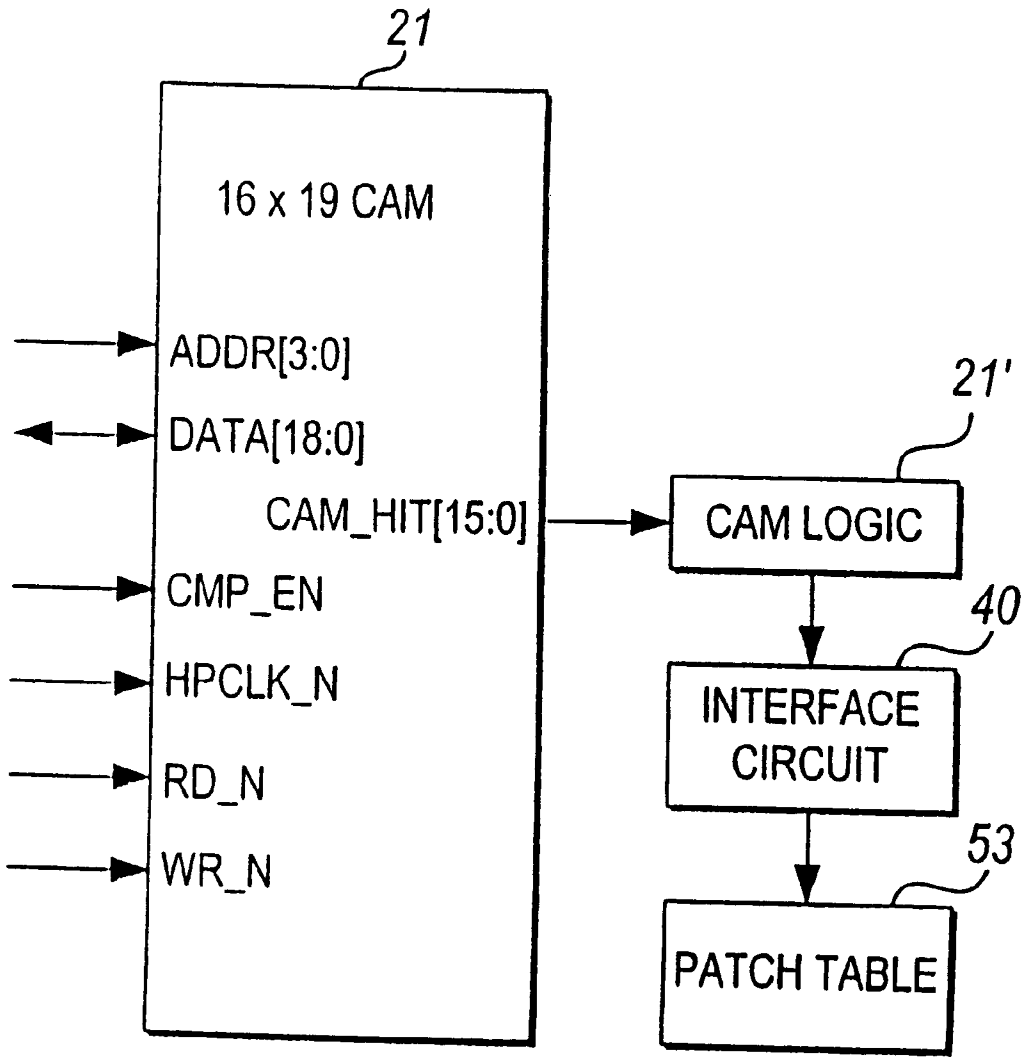
FIG. 3 is a circuit diagram of a possible implementation of a loop filter.
Figure 4:
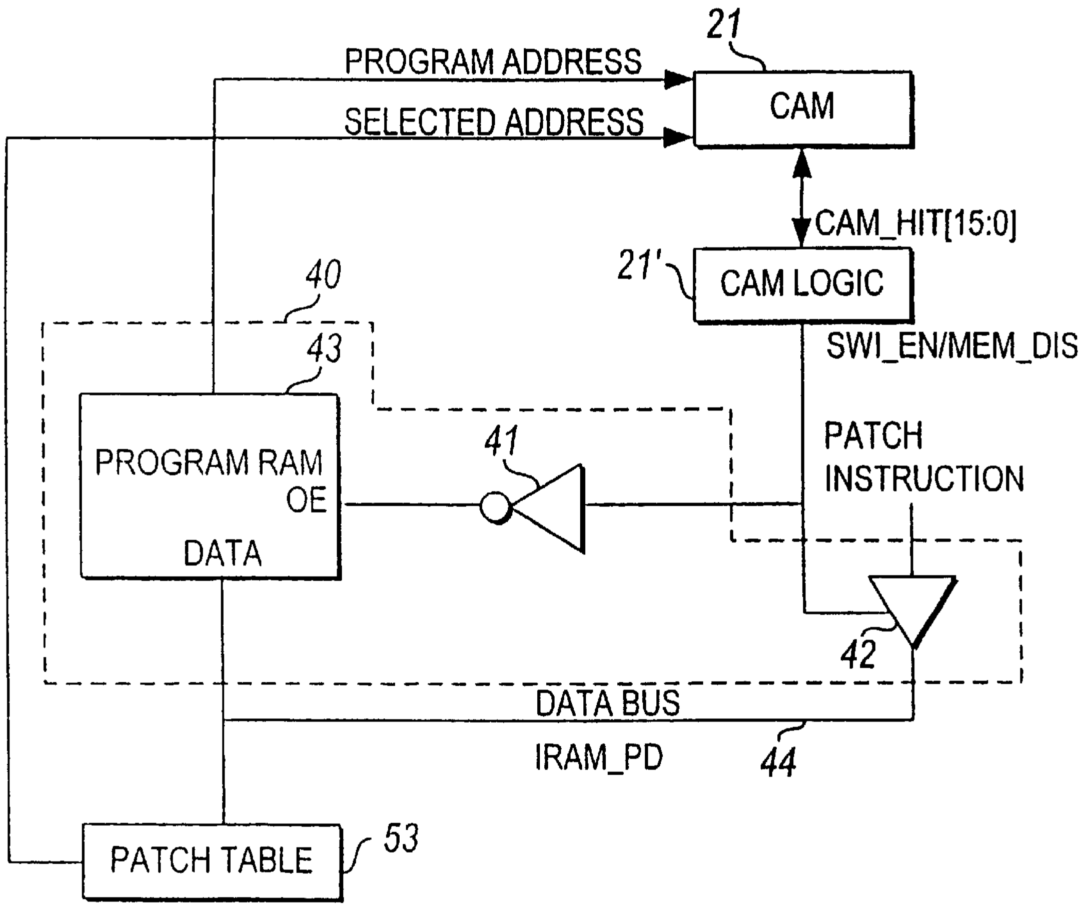
FIG. 4 is a diagrammatic representation of the V-I converter of the present invention.

With reference to FIG. 4, there is shown a diagrammatic representation of the voltage to current (V-I) converter 400 of the present invention, comprising a low transconductance element 402, a capacitive element 404, a high gain converting element 406, and a low gain converting element 408. Together, the low transconductance element 402 and the capacitive element 404 form a low pass filter 410. The output of the low pass filter 410 is fed to the high gain converting element 406. Since only low frequency or direct current (DC) signals are allowed to pass through element 410, elements 402, 404, and 406 comprise the low frequency signal path of the V-I converter 400. In contrast, low gain converting element 408 has no filtering element; thus, it passes all relevant frequencies. As a result, element 408 comprises the high frequency or alternating current (AC) signal path of the V-I converter 400.

In order to filter out high frequency signals, a low pass filter needs to have a relatively large time constant (where time constant is defined as the product of resistance and capacitance (RC)). The larger the time constant, the lower the frequency a signal has to have to pass through the filter. Since elements 402 and 404 are to behave as a low pass filter, they preferably have a relatively large combined time constant. This in turn means that the product of the effective resistance of element 402 and the capacitance of element 404 is preferably large. In most implementations, it is desirable to keep the capacitance of element 404 small so that minimal space is required to implement the element on a chip. To keep the capacitance small and still maintain a relatively large time constant, the effective resistance of element 402 needs to be large. In the preferred embodiment, element 402 is an active processing element. In order for the effective resistance of an active element to be large, the ratio of voltage in to current out (Vin/Iout) for the element needs to be large (since resistance R equals V/I according to Ohm's law). Put another way, the inverse of resistance, also know as the transconductance of the element needs to be small. For this reason, element 402 is preferably a low transconductance element. Since transconductance(gm) is defined as Iout/Vin, element 402 is preferably an active processing element having a low Iout/Vin ratio, meaning that the element has a low voltage to current gain.

Element 402 preferably receives two input signals: (1) a control voltage signal (Vcontrol); and (2) a reference voltage signal (Vref). The control signal Vcontrol represents the voltage signal that is to be converted into an output current, while the reference signal Vref is a signal used in the conversion process. In the preferred embodiment, Vref is set to the optimal charge pump output voltage, which in many instances is approximately half the value of the voltage source used to drive converter 400. Once the input signals are received, elements 402 and 404 operate to filter the control signal Vcontrol to remove therefrom the high frequency components. The resultant filtered signal having only low frequency and direct current components is then passed to the high gain converting element 406.

In response, the converting element 406 converts the filtered signal into an output current which is passed to the output of the converter. Preferably, elements 410 and 406 have a high combined voltage to current gain such that a relatively small swing in voltage at the input of element 410 will produce a relatively large change in current at the output of the converting element 406. Together, elements 402, 404, and 406 act as a high current gain converter for the low frequency components of the control signal Vcontrol.

The low gain converting element 408 also receives as inputs the control voltage Vcontrol and the reference voltage Vref. In response to the inputs, converting element 408 converts the control voltage Vcontrol into an output current. This output current is combined with the output current from the high gain converting element 406 to provide an overall output current at the output of the converter 400. Preferably, converting element 408 has a substantially flat frequency response so that it effectively passes all relevant frequencies, including the high frequency components of the control sign Vcontrol. Also, converting element 408 preferably has a voltage to current gain which is substantially smaller than the combined voltage to current gain of the low gin element 402 and the converting element 406. As a result, the current from the low gain converting element 408 will be much less significant than the current from the high gain converting element 406.

The rationale for having a high gain on the low frequency path and a low gain on the high frequency path is that such an arrangement minimizes the effects of noise on the V-I converter. This rationale is founded upon two bases. First, it is generally true that most noise components have high frequencies. By implementing a high gain on the low frequency path and a low gain on the high frequency path, the present invention makes the high frequency noise components insignificant relative to the low frequency components. Second, in a PLL, low frequency noise components are corrected for b) the PLL loop gain. Thus, if the V-I converter of the present invention is implemented as part of a PLL, and if the input to the V-I converter has low frequency noise components, the low frequency noise components will have relatively little effect on the output of the converter since these components are corrected for by the PLL loop gain. This aspect of the PLL makes it possible to subject the low frequency components to a high voltage to current gain without suffering increased sensitivity to low frequency noise. Overall, the V-I converter of the present invention makes it possible to convert a relatively small input voltage range into a relatively large output current range without suffering increased sensitivity to noise.

Figure 8:
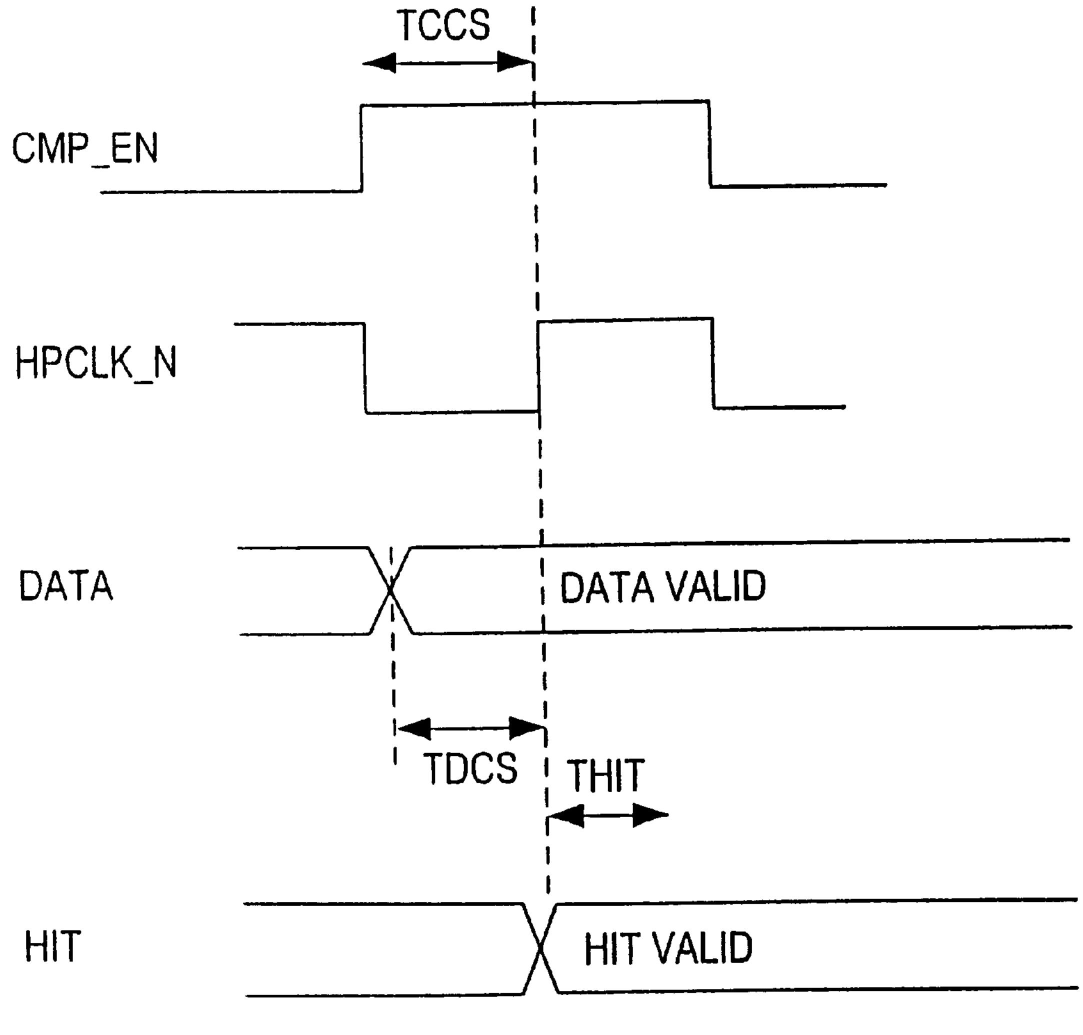
FIG. 8 is a diagrammatic representation of the frequency response of the V-I converter of the present invention.

With reference to FIG. 8, there is shown a diagrammatic representation of the frequency response of the V-I converter 400 of the present invention, wherein the overall response includes a component from the low frequency path of the converter 400 and a component from the high frequency path of the converter 400. In the graphs of FIG. 8, the vertical axis represents the log of the voltage to current gain, while the horizontal axis represents the log of the frequency. As expected, the low frequency path of the converter 400 has a relatively high gain at low frequencies, and substantially no gain at high frequencies. In contrast to the low frequency path, the high frequency path has a relatively low gain which is relatively constant at substantially all frequencies. Combined- the low and high frequency paths produce the frequency response shown, having a relatively high gain at low frequencies and a relatively low and constant gain at high frequencies. When the V-I converter 400 is implemented as part of a PLL, it is preferable that the PLL loop unity gain frequency fall within the frequency range in which the gain is relatively low and constant, as shown in FIG. 8.

Having a relatively constant low gain at high frequencies is advantageous for several practical reasons. First, having a low gain at the PLL unity gain frequency minimizes the size of the loop filter capacitor needed to render the PLL stable. This in turn reduces the space required on a chip to fabricate the capacitor, which in turn reduces manufacturing costs. Second, having a low gain and a relatively flat frequency response (i.e. relatively constant gain) leads to greater stability of the PLL. These advantages lead to greater practicality of the present invention.

FIRST PREFERRED EMBODIMENT

Figure 5:
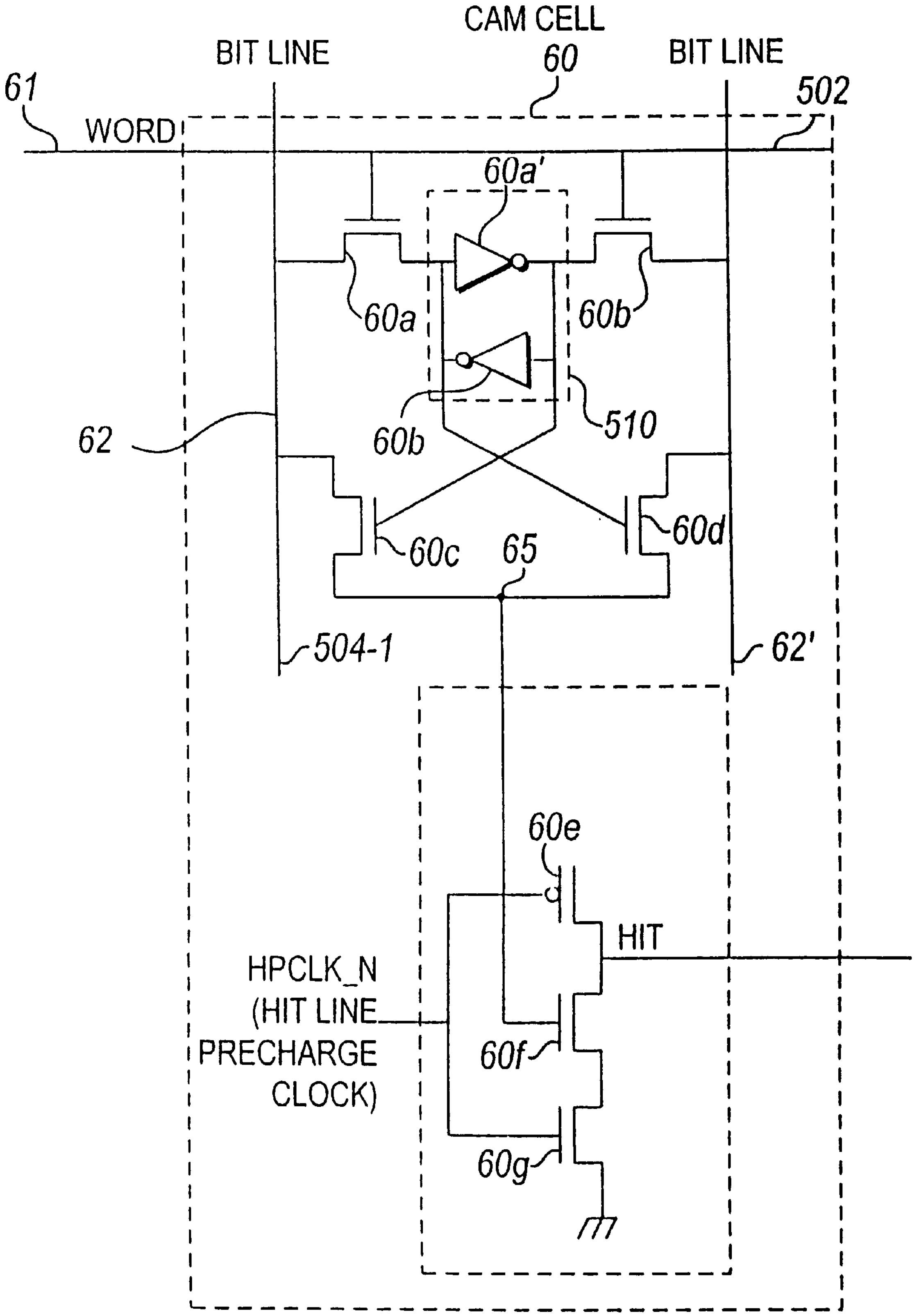
FIG. 5 is a circuit diagram of a first preferred embodiment of the V-I converter of the present invention.

With reference to FIG. 5, there is shown a circuit diagram of a first preferred embodiment of the V-I converter of the present invention. In FIGS. 4 and 5, like components are labeled with identical reference numbers. Thus, the elements 402, 404, 406, and 408 of FIG. 5 indicated by dashed boxes correspond to the elements 402, 404, 406, and 408, respectively of FIG. 4. In this preferred embodiment, PMOS and NMOS transistors are used to implement the invention. However, it should be noted that other types of transistors, including but not limited to other types of MOSFET's, JFET's and BJT's, may also be used In addition, devices other than transistors which perform the same or similar functions may be substituted. To facilitate description of the invention, the following convention will be employed. A PMOS transistor will be shown as a transistor having a solid arrow pointing towards the gate of the transistor, while an NMOS transistor will be shown as having a solid arrow pointing away from the gate. Also, the terminal of the transistor having the solid arrow will be the source terminal, regardless of the direction in which the arrow points. Thus, according to this convention, transistor 512 is a PMOS transistor having its source terminal coupled to a voltage source VDD, and transistor 516 is an NMOS transistor having its source terminal coupled to ground.

As shown in FIG. 5, the low gm element 402 preferably comprises a plurality of transistors, including input transistors 502 and 504. Transistor 502 preferably is an NMOS transistor having a gate terminal coupled to receive the reference voltage signal Vref, a source terminal, and a drain terminal. Vref is preferably set to the optimal charge pump output voltage, which in many instances is approximately half the value of the voltage source VDD. Transistor 504 preferably is an NMOS transistor having a gate terminal coupled to receive the control voltage signal Vcontrol, a source terminal coupled to the source terminal of transistor 502, and a drain terminal. The drain terminals of transistors 502 and 504 are preferably coupled to current sourcing mirrors 522 and 523, respectively. Sourcing mirrors 522, 523 provide sourcing current to the output of the low gm element 402.

The sourcing mirrors 522, 523 preferably comprise four sourcing transistors 506, 508, 510, and 512. Transistor 506 is a PMOS transistor having a source terminal coupled to the voltage source VDD, a gate terminal, and a drain terminal. Transistor 508 is a PMOS transistor having a source terminal coupled to the voltage source VDD, a gate terminal coupled to the gate terminal of transistor 506, and a drain terminal coupled to the drain terminal of transistor 502. The drain terminal of transistor 508 is also coupled back to the gate terminals of transistors 506 and 508. Because the gate terminals of transistors 506 and 508 are coupled together, they are said to be “mirrored”. The other sourcing transistors 510 and 512 form a similar mirror. Transistor 512 is a PMOS transistor having a source terminal coupled to the voltage source VDD, a gate terminal, and a drain terminal coupled to output of the low gm element 402. Transistor 510 is a PMOS transistor having a source terminal coupled to the voltage source VDD, a gate terminal coupled to the gate terminal of transistor 512, and a drain terminal coupled to the drain terminal of transistor 504. The drain terminal of transistor 510 is also coupled back to the gate terminals of transistors 510 and 512. Because the gate terminals of transistors 510 and 512 are coupled together, they are “mirrored”.

The sourcing mirrors 522, 523 are coupled to a current sink 524. Current sink 524 preferably comprises a pair of mirrored sinking transistors 514 and 516. Transistor 514 is an NMOS transistor having a drain terminal coupled to the drain terminal of transistor 506, a source terminal coupled to ground, and a gate terminal coupled back to the drain terminal. Transistor 516 is an NMOS transistor having a drain terminal coupled to the drain terminal of transistor 512 (which also happens to be the output of the low gm element 402), a source terminal coupled to ground, and a gate terminal coupled to the gate terminal of transistor 514. Transistors 514 and 516 are mirrored with each other.

The low gm element 402 preferably further comprises two other transistors 518 and 520. Transistor 518 is an NMOS transistor having a drain terminal coupled to the source terminals of transistors 502 and 504, a source terminal coupled to ground, and a gate terminal. Transistor 520, referred to as the biasing transistor, is an NMOS transistor having a drain terminal coupled to a current source (not shown) providing a biasing current Ibias, a source terminal coupled to ground, and a gate terminal coupled both to the drain terminal of the biasing transistor 520 and to the gate terminal of transistor 518. Since the gate terminals of transistors 518 and 520 are coupled together, the transistors are mirrored to each other.

The output of the low gm element 402 is applied to the capacitive element 404. Together, elements 402 and 404 act as a low pass filter to filter the voltage control signal Vcontrol to provide a filtered signal to the converting element 406. Converting element 406 preferably comprises an operational amplifier (op-amp) 530, an NMOS transistor 532, and a resistor 534. The op-amp 530 has a first input coupled to receive the filtered signal, a second input coupled to the source terminal of NMOS transistor 532, and an output coupled to the gate terminal of transistor 532. The resistor 534 is coupled to the source terminal of the transistor 532 and to ground. The drain terminal of transistor 532 acts as the output of the converting element 406. In this configuration, the amplifier 530 and the transistor 532 are set up as a voltage follower, with the voltage at the source terminal of transistor 532 being the same as the voltage at the positive input of the op-amp 530. The voltage to current gain of the converting element 406 is determined by the value of the resistor 534, where a smaller resistor value leads to a higher gain. The value of resistor 534 is preferably selected such that the combined voltage to current gain of elements 410 and 406 is much higher than the voltage to current gain of the converting element 408.

In addition to the output current from the high gain converting element 406, the output of the V-l converter 400 also includes an output current from the low gain converting element 408. These two currents are combined to produce an overall output current. As shown in FIG. 5, the low gain converting element 408 preferably comprises an op-amp 540 having a first input coupled to receive the control voltage Vcontrol, a second input coupled to the source terminal of an NMOS transistor 542, and an output coupled to the gate terminal of transistor 542. A resistor 544 is coupled to the source terminal of transistor 542 and to ground. The drain terminal of transistor 542 is coupled to the output of the V-I converter. In this configuration, the voltage at the source terminal of transistor 542 is the same as the voltage at the positive input of the op-amp 540.

Converting element 408 preferably further comprises a second op-amp 550 having a first input coupled to receive the reference voltage Vref, a second input coupled to the source terminal of an NMOS transistor 552, and an output coupled to the gate terminal of transistor 552. A resistor 554 is coupled to the source terminal of transistor 552 and to ground. In this configuration, the voltage at the source terminal of transistor 552 is the same as the voltage at the positive input of the op-amp 550. The low gain converting element 408 preferably further comprises a pair of PMOS transistors 560 and 562. Transistor 560 has a source terminal coupled to the voltage source VDD, a drain terminal coupled to the drain terminal of transistor 542, and a gate terminal. Transistor 562 has a source terminal coupled to the voltage source VDD, a gate terminal coupled to the gate terminal of transistor 560, and a drain terminal coupled both to the drain terminal of transistor 552 and to the gate terminals of transistors 560 and 562. Transistors 560 and 562 are mirrored to each other.

Set up in the manner described, the voltage to current gain of the converting element 408 is determined by the values of resistors 544 and 554. Preferably, the values of these resistors 544, 554 are selected such that the voltage to current gain of the converting element 408 is much lower than the voltage to current gain of the converting element 406. At this point, it should be noted that the output of the converting element 408 is capable of both sourcing and sinking current. This aspect of the converting element 408 enables it to manage AC signals having no DC components.

ALTERNATIVE PREFERRED EMBODIMENT

Figure 6:
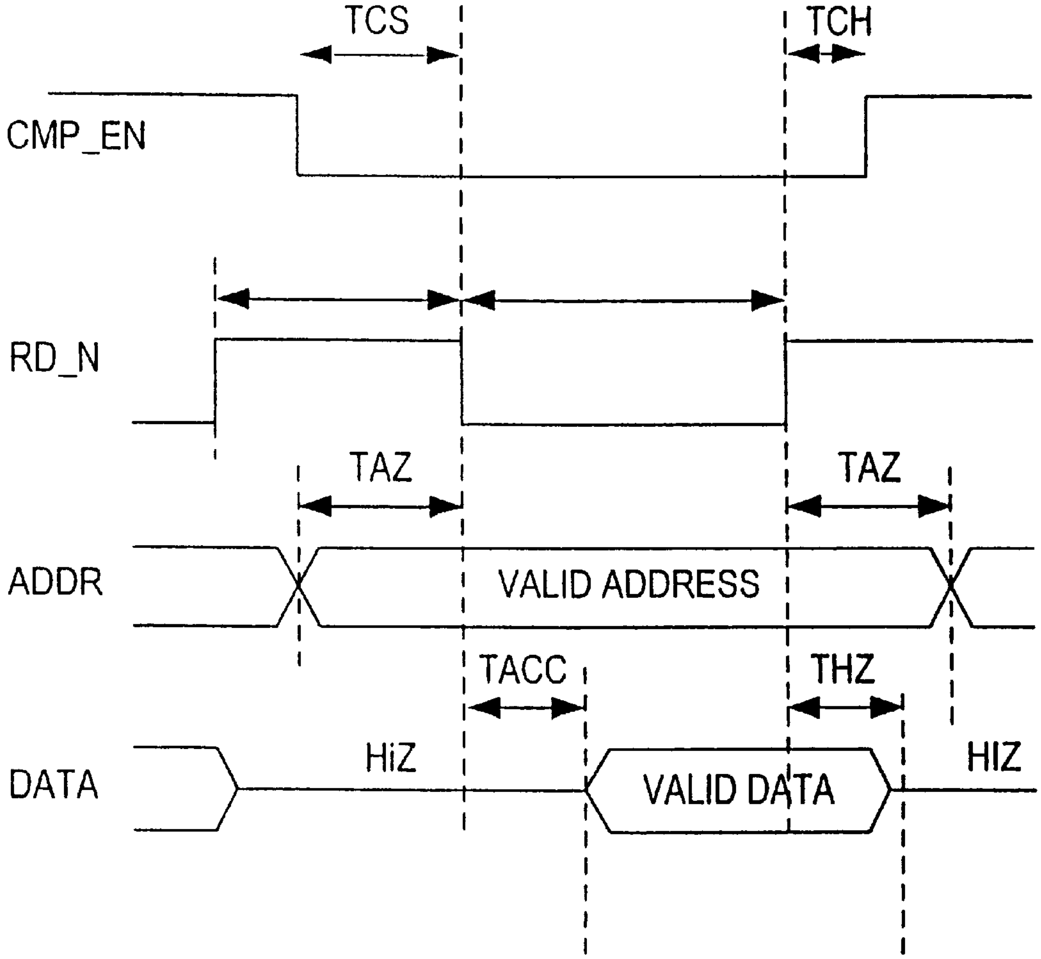
FIG. 6 is a circuit diagram of an alternative embodiment of the V-I converter of the present invention.

Thus far, the V-I converter of the present invention has been described as comprising op-amps 530, 540, and 550. These op-amps have been included in the preferred embodiment because they simplify the calculation of voltages and currents in the circuit. However, they are not necessary for the proper operation of the invention. Instead, the filtered signal, the control voltage Vcontrol, and the reference voltage Vref may be applied directly to the gate terminal of transistors 532, 542, and 552, respectively. Such an embodiment is shown in FIG. 6. This and other modifications are within the spirit and scope of the invention.

APPLICATION IN A VOLTAGE CONTROLLED OSCILLATOR

Figure 7:
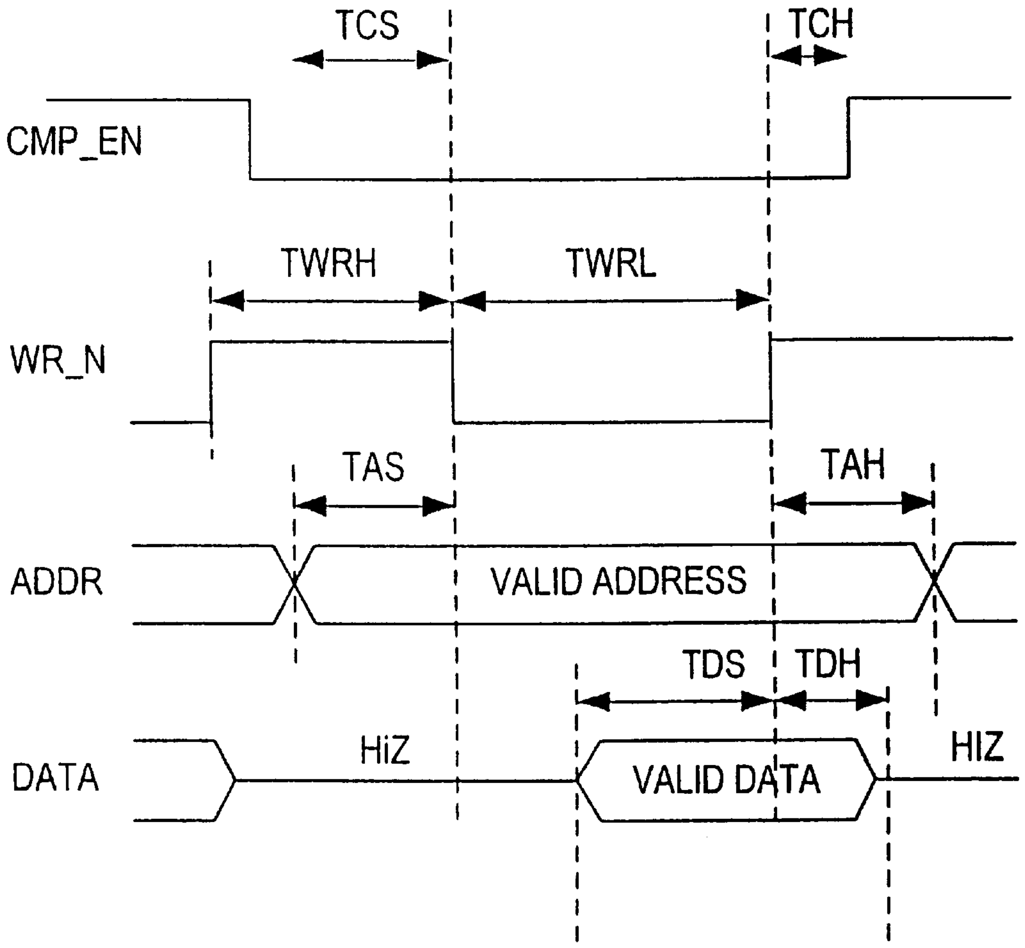
FIG. 7 is a diagrammatic representation of a voltage controlled oscillator in which the V-I converter of the present invention may be implemented.

With reference to FIG. 7, there is shown a diagrammatic representation of a voltage controlled oscillator 700 in which the V-I converter of the present invention may be advantageously implemented. The oscillator 700 comprises the V-I converter 400 of the present invention for converting a control voltage Vcontrol into a current, and a current to frequency (I-F) converter 706 for converting the current into an output signal having a certain frequency determined by the current. The I-F converter 706 may take many different forms, including that of a ring oscillator comprising a plurality of inverters coupled in series. The oscillator 700 also comprises a pair of mirrored PMOS transistors 702 and 704 which serve to provide a "copy" of the current from the V-I converter 400 to the I-F converter 706. Together, converters 400 and 706 provide an effective mechanism for generating an output signal having a certain frequency based upon a control voltage signal Vcontrol.

As noted previously, the V-I converter 400 of the present invention makes it possible to convert a relatively small input voltage range into a relatively large output current range without suffering increased sensitivity to noise. Since the range of frequencies generated by I-F converter 706 is determined by the range of currents provided by the V-I converter 400, an increased current range produces an increased frequency range. Because the currents generated by the V-I converter 400 do not suffer from increased sensitivity to noise, the output signals generated by the I-F converter in turn do not suffer from increased sensitivity to noise. Thus, the present invention makes it possible to increase the Δfrequency/Δvoltage gain of the VCO 700 without increasing the VCO's sensitivity to noise.

IMPLEMENTATION IN A PHASE LOCK LOOP

Figure 1:
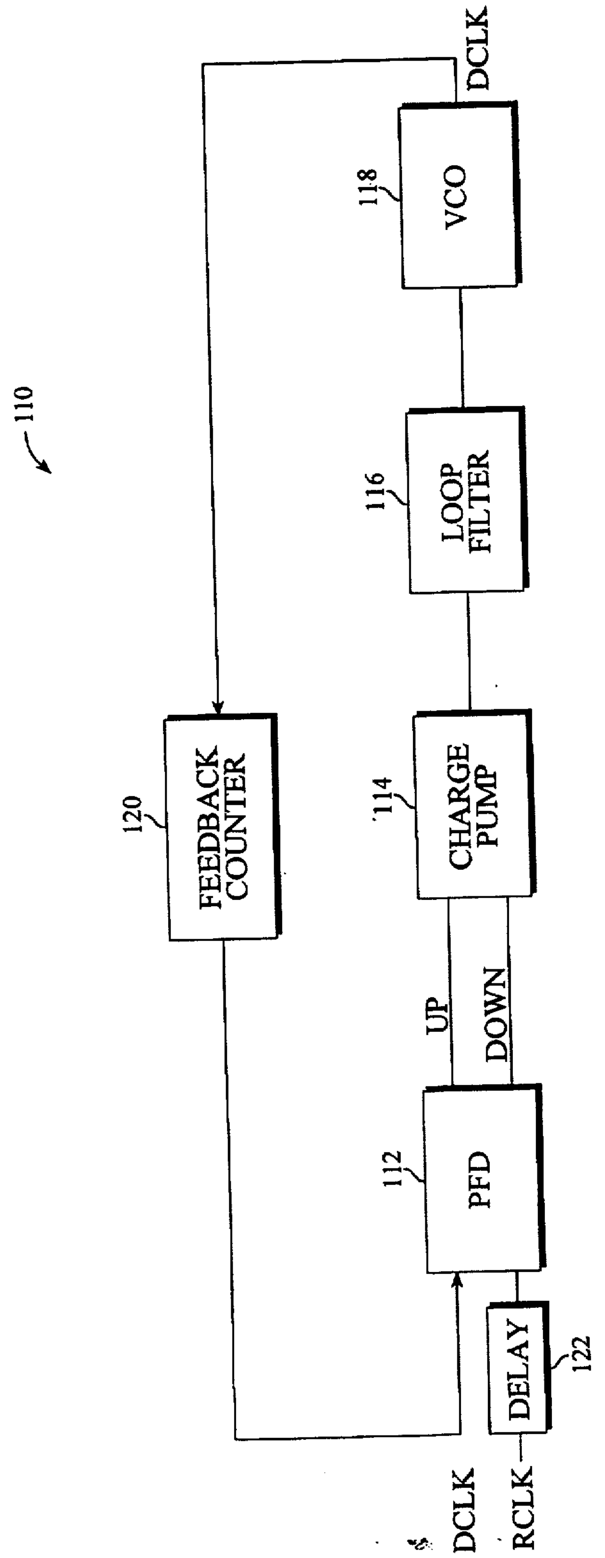
Fig. 1 (Prior Art)
Figure 2:
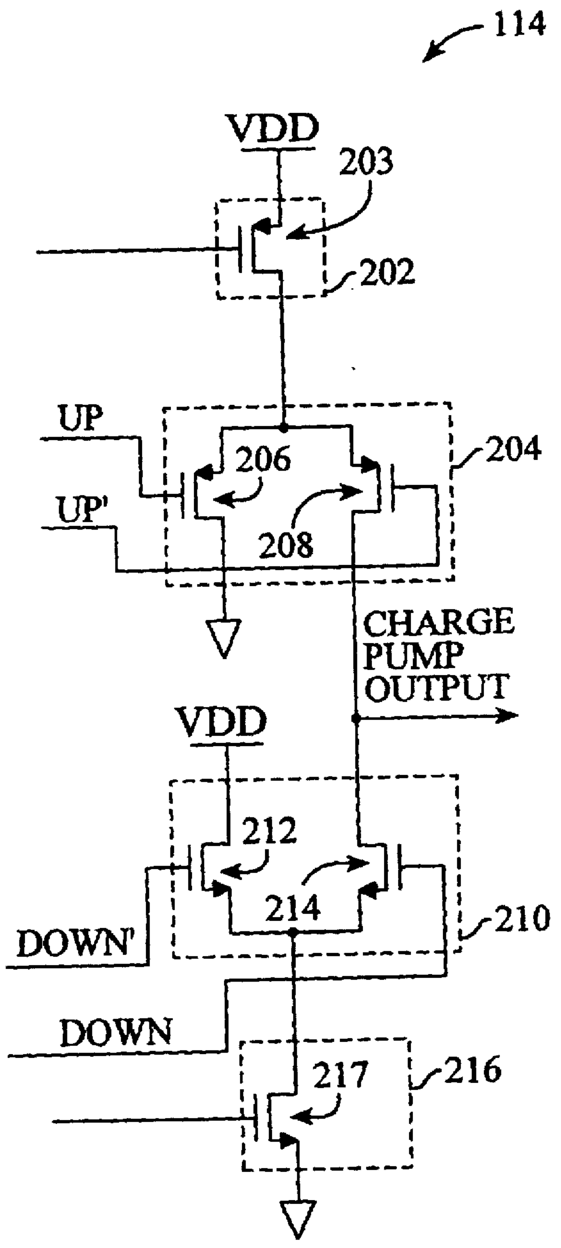
Fig. 2 (Prior Art)
Figure 3:
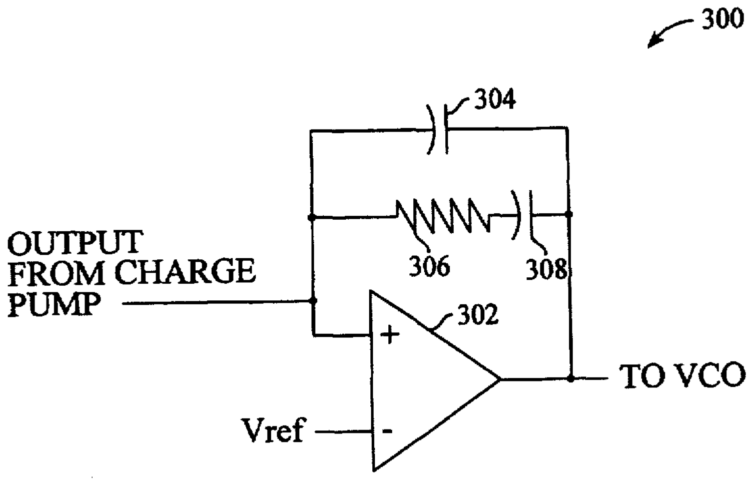
Figure 7:
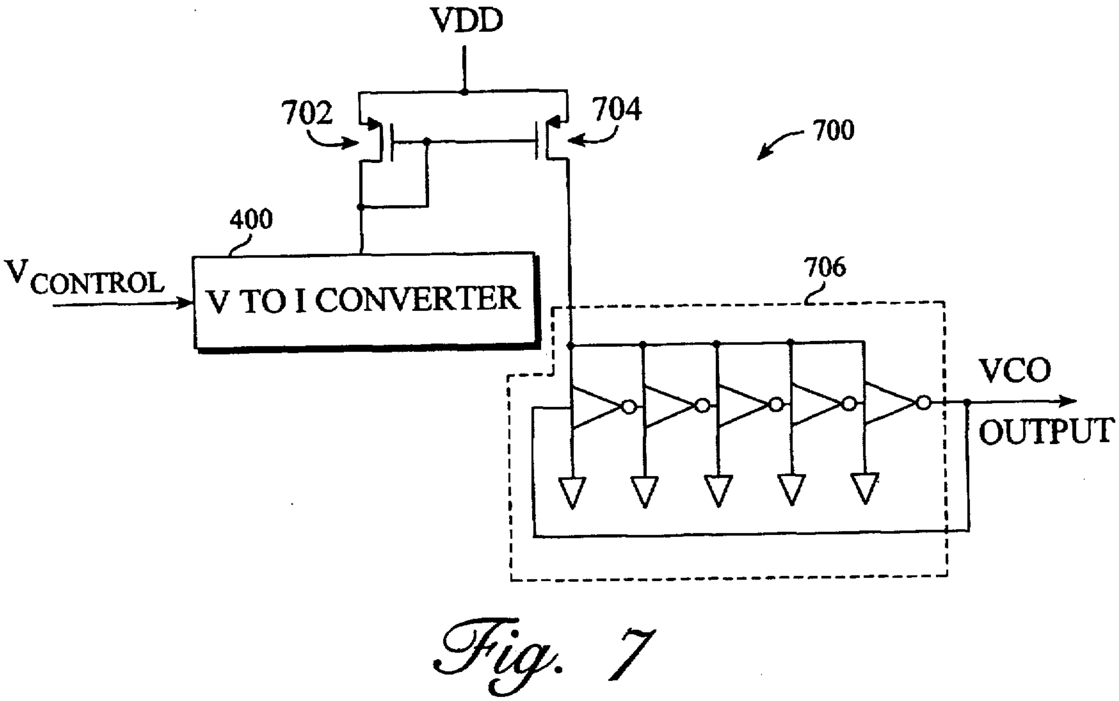
Figure 4:
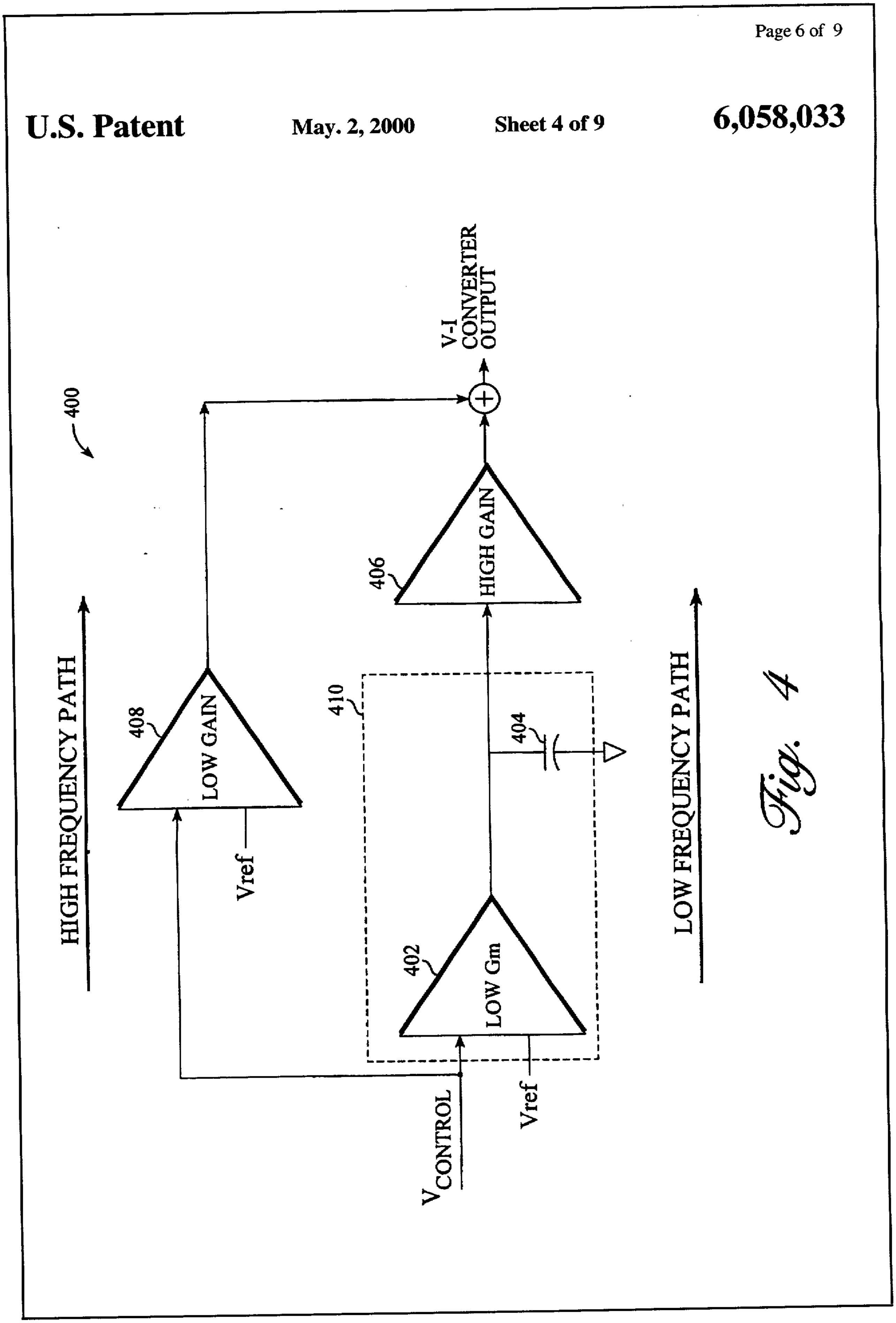
Figure 5:
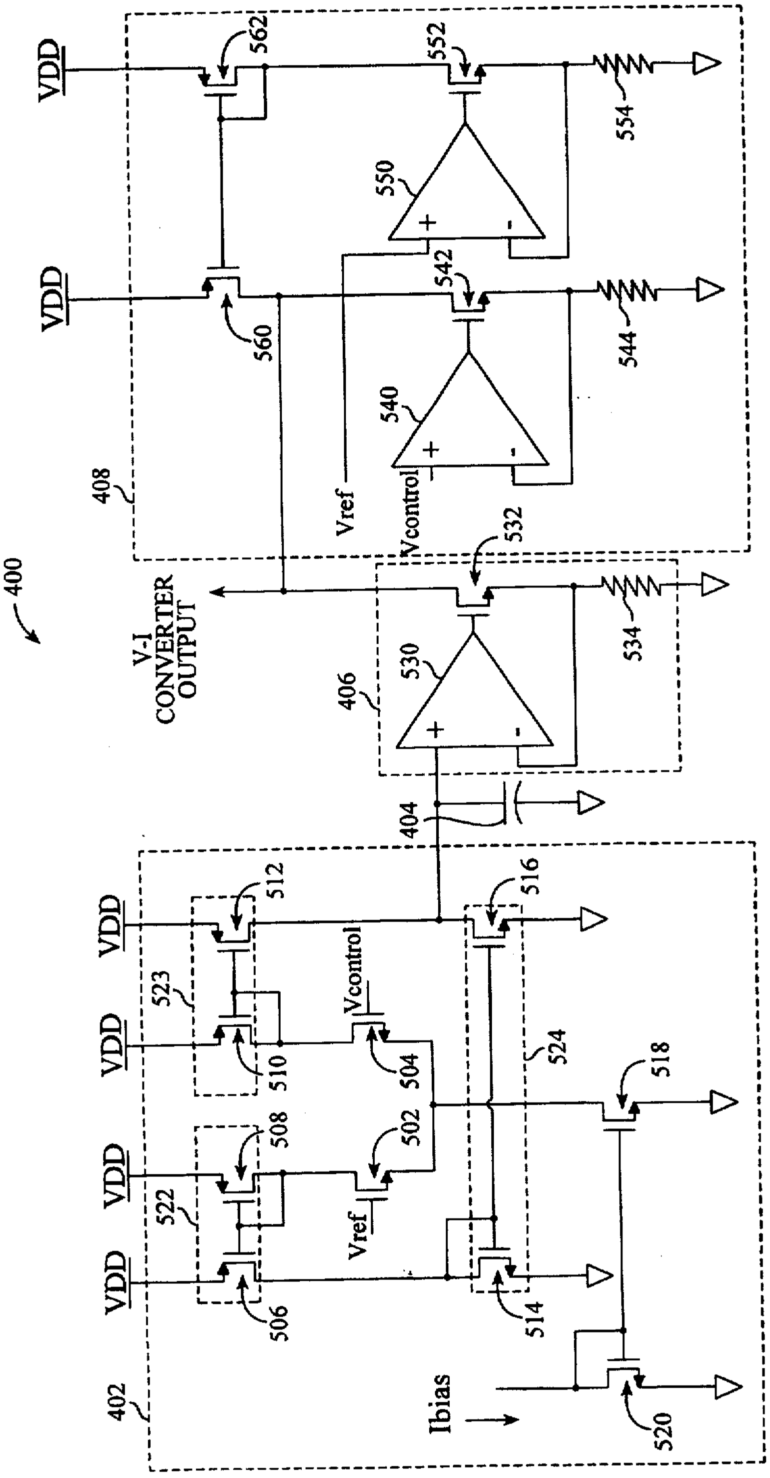
Figure 6:
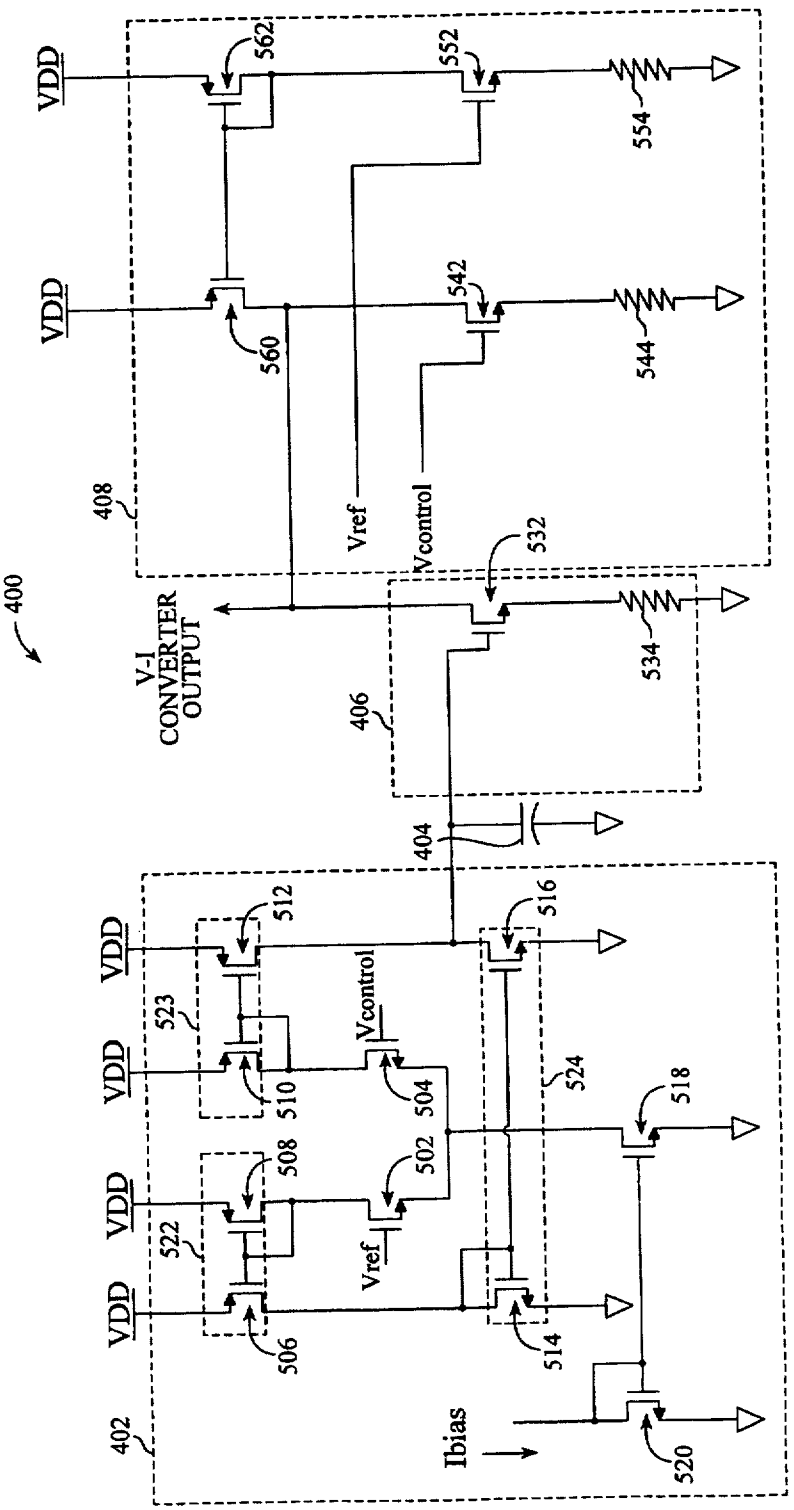
Figure 8:
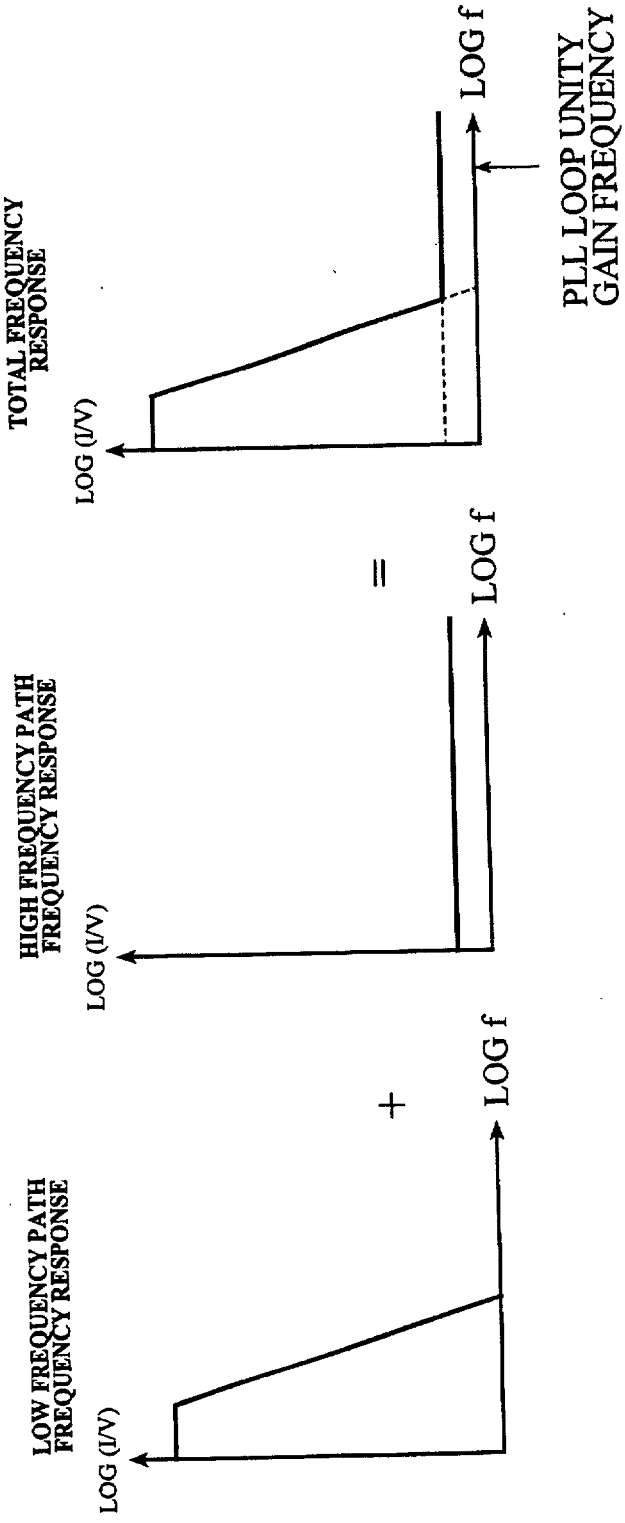

The VCO 700 of FIG. 7 may be implemented as the VCO 118 in the PLL 110 of FIG. 1 to solve the charge pump excursion problem. By using the V-I converter 400 of the present invention, the range of voltages that need to appear at the input of the VCO 118 can be reduced from 0.8 V–2.4 V to approximately 1 V–1.5 V. Within this significantly reduced voltage range, charge pump excursion is relatively minimal. Thus, it is possible to get consistent performance from the charge pump 114 throughout the entire range of possible voltages. As a result, equal control pulse widths at the input of the charge pump will result in substantially zero net charge being injected into the loop filter 116. This in turn results in minimal clock skew at the input of the PFD 112.

At this point, it should be noted that although the invention has been described with reference to specific embodiments, it should not be construed to be so limited. Various modifications can be made by those of ordinary skill in the art with the benefit of this disclosure without departing from the spirit of the invention. For example, the invention has been described as being especially useful in a voltage controlled oscillator context. However, it is not limited to such implementations. Rather, it can be applied to any situation in which it is desirable to convert a small input voltage range into a relatively large output current range without increasing sensitivity to noise. These and other uses and modifications are within the spirit and scope of the present invention. Thus, the invention should not be limited by the specific embodiments used to illustrate it but only by the scope of the appended claims.

What is claimed is:

1. A voltage to current converter, comprising:

a low pass filter having an input for receiving an input voltage signal, and an output for providing a filtered signal;

a first converting element having an input coupled to the output of the low pass filter to receive said filtered signal, and an output for providing a first output current in response to said filtered signal, said first converting element having a high voltage to current gain;

a second converting element having an input for receiving said input voltage signal, and an output for providing a second output current in response to said input voltage signal, said second converting element having a substantially flat frequency response in a selected frequency range and a low voltage to current gain relative to the voltage to current gain of said first converting element; and an output for combining said first and second output currents to provide an overall output current.

2. The voltage to current converter of claim 1, wherein said low pass filter comprises:

a processing element having an input for receiving said input voltage signal and an output, said processing element having a low transconductance; and a capacitive element coupled to the output of said processing element.

3. The voltage to current converter of claim 2, wherein said processing element comprises:

a first input transistor coupled to receive a reference voltage signal;

a second input transistor coupled to receive said input voltage signal;

a current source coupled to said first and second transistors;

a current sink coupled to said current source; and an output coupled to said current source and said current sink.

4. The voltage to current converter of claim 3, wherein said first input transistor has a gate terminal coupled to receive said reference voltage signal, a drain terminal coupled to said current source, and a source terminal, and wherein said second input transistor has a gate terminal coupled to receive said input voltage signal, a drain terminal coupled to said current source, and a source terminal coupled to the source terminal of said first input transistor.

5. The voltage to current converter of claim 4, wherein said current source comprises:

a first source transistor having a source terminal coupled to a voltage source, a drain terminal coupled to said current sink, and a gate terminal;

a second source transistor having a source terminal coupled to said voltage source, a drain terminal coupled to the drain terminal of said first input transistor, and a gate terminal coupled to the gate terminal of said first source transistor;

a third source transistor having a source terminal coupled to said voltage source, a drain terminal coupled to the drain terminal of said second input transistor; and a gate terminal; and a fourth source transistor having a source terminal coupled to said voltage source, a drain terminal coupled to said current sink and the output of said processing element, and a gate terminal coupled to the gate terminal of said third source transistor.

6. The voltage to current converter of claim 5, wherein the drain terminal of said second source transistor is coupled to the gate terminal of said first source transistor and the gate terminal of said second source transistor, and wherein the drain terminal of said third source transistor is coupled to the gate terminal of said third source transistor and the gate terminal of said fourth source transistor.

7. The voltage to current converter of claim 4, wherein said current sink comprises:

a first sink transistor having a drain terminal coupled to said current source, a source terminal coupled to ground, and a gate terminal; and a second sink transistor having a drain terminal coupled to said current source and the output of said processing element, a source terminal coupled to ground, and a gate terminal coupled to the gate terminal of said first sink transistor.

8. The voltage to current converter of claim 7, wherein the drain terminal of said first sink transistor is coupled to the gate terminal of said first sink transistor and the gate terminal of said second sink transistor, and wherein the drain terminal of said second sink transistor is coupled to the gate terminal of said first sink transistor and the gate terminal of said second sink transistor.

9. The voltage to current converter of claim 1, wherein said first converting element comprises:

a transistor having a first terminal coupled to receive said filtered signal, a second terminal coupled to the output of said voltage to current converter, and a third terminal; and a resistor coupled to the third terminal of said transistor and to ground.

10. The voltage to current converter of claim 1, wherein said first converting element comprises:

an amplifier having a first input for receiving said filtered signal, a second input, and an output;

a transistor having a first terminal coupled to the output of said amplifier, a second terminal coupled to the output of said voltage to current converter, and a third terminal coupled to the second input of said amplifier; and a resistor coupled to the third terminal of said transistor and to ground.

11. The voltage to current converter of claim 1, wherein said second converting element comprises:

a first transistor having a first terminal coupled to receive said input voltage signal, a second terminal coupled to the output of said voltage to current converter, and a third terminal; and a first resistor coupled to the third terminal of said first transistor and to ground.

12. The voltage to current converter of claim 11, further comprising:

a second transistor having a first terminal coupled to receive a reference voltage signal, a second terminal coupled to a voltage source, and a third terminal; and a second resistor coupled to the third terminal of said second transistor and to ground.

13. The voltage to current converter of claim 12, further comprising:

a third transistor having a first terminal, a second terminal coupled to the second terminal of said first transistor, and a third terminal coupled to said voltage source; and a fourth transistor having a first terminal coupled to the first terminal of said third transistor, a second terminal coupled to the second terminal of said second transistor and the first terminals of said third and fourth transistors, and a third terminal coupled to said voltage source.

14. The voltage to current converter of claim 1, wherein said second converting element comprises:

a first amplifier having a first input for receiving said input voltage signal, a second input, and an output;

a first transistor having a first terminal coupled to the output of said first amplifier, a second terminal coupled to the output of said voltage to current converter, and a third terminal coupled to the second input of said first amplifier; and a first resistor coupled to the third terminal of said first transistor and to ground.

15. The voltage to current converter of claim 14, further comprising:

a second amplifier having a first input for receiving a reference voltage signal, a second input, and an output;

a second transistor having a first terminal coupled to the output of said second amplifier, a second terminal coupled to a voltage source, and a third terminal coupled to the second input of said second amplifier; and a second resistor coupled to the third terminal of said second transistor and to ground.

16. The voltage to current converter of claim 15, further comprising:

a third transistor having a first terminal, a second terminal coupled to the second terminal of said first transistor, and a third terminal coupled to said voltage source; and a fourth transistor having a first terminal coupled to the first terminal of said third transistor, a second terminal coupled to the second terminal of said second transistor and the first terminals of said third and fourth transistors, and a third terminal coupled to said voltage source.

17. A voltage controlled oscillator, comprising:

a voltage to current converter having an input for receiving an input voltage signal, and an output for providing a control current in response to said input voltage signal; and a current to frequency converter having an input coupled to receive said control current, and an output for providing an output signal having a certain frequency, said frequency being determined by said control current;

wherein said voltage to current converter comprises:

a low pass filter having an input for receiving said input voltage signal, and an output for providing a filtered signal;

a first converting element having an input coupled to the output of the low pass filter to receive said filtered signal, and an output coupled to the output of said voltage to current converter for providing a first output current in response to said filtered signal, said first converting element having a high voltage to current gain; and a second converting element having an input for receiving said input voltage signal, and an output coupled to the output of said voltage to current converter for providing a second output current in response to said input voltage signal, said second converting element having a substantially flat frequency response in a selected frequency range and a low voltage to current gain relative to the voltage to current gain of said first converting element;

wherein the output of said voltage to current converter combines said first and second output currents to derive said control current.

18. A phase lock loop, comprising:

a phase frequency detector having a first input for receiving an input signal, a second input for receiving a reference signal, and at least one output for providing at least one control signal indicating any difference in phase and frequency between said input signal and said reference signal;

a charge pump having at least one input for receiving said it least one control signal, and an output for providing a net current in response to said at least one control signal;

a loop filter having an input coupled to receive said net current from said charge pump, and an output for providing a control voltage determined by said net current; and a voltage controlled oscillator having an input coupled to receive said control voltage, and an output for providing an output signal having a frequency determined by said control voltage, the output of said voltage controlled oscillator being coupled to the first input of said phase frequency detector, said voltage controlled oscillator comprising:

a voltage to current converter having an input for receiving said control voltage, and an output for providing a control current in response to said control voltage; and a current to frequency converter having an input coupled to receive said control current, and an output for providing an output signal having a certain frequency, said frequency being determined by said control current;

wherein said voltage to current converter comprises:

a low pass filter having an input for receiving said input voltage signal, and an output for providing a filtered signal;

a first converting element having an input coupled to the output of the low pass filter to receive said filtered signal, and an output coupled to the output of said voltage to current converter for providing a first output current in response to said filtered signal, said first converting element having a high voltage to current gain; and a second converting element having an input for receiving said input voltage signal, and an output coupled to the output of said voltage to current converter for providing a second output current in response to said input voltage signal, said second converting element having a substantially flat frequency response in a selected frequency range and a low voltage to current gain relative to the voltage to current gain of said first converting element;

wherein the output of said voltage to current converter combines said first and second output currents to derive said control current.

* * * * *

UNITED STATES PATENT AND TRADEMARK OFFICE

CERTIFICATE OF CORRECTION

PATENT NO. : 6,058,033
DATED : May 2, 2000
INVENTOR(S) : Williams et al.

It is certified that error appears in the above-identified patent and that said Letters Patent is hereby corrected as shown below:

Title page,
Showing the illustrative figure, should be deleted and substitute therefor the attached title page.

The drawing sheets consisting of Figs. 1-8, should be deleted to be replaced with the drawing sheets, consisting of Figs. 1-8, as shown on the attached pages.

Signed and Sealed this

Thirteenth Day of November, 2001

*Attest:*

Nicholas P. Godici

NICHOLAS P. GODICI

*Attesting Officer* *Acting Director of the United States Patent and Trademark Office*

United States Patent [19]

Williams et al.

[11] Patent Number: 6,058,033

[45] Date of Patent: May 2, 2000

[54] VOLTAGE TO CURRENT CONVERTER WITH MINIMAL NOISE SENSITIVITY

[75] Inventors: Stephen T. Williams, Laurel; Eric Naviasky, Ellicot City; Michael Hufford, Catonsville; Timothy Henricks, Marriottsville, all of Md.

[73] Assignee: Cadence Design Systems, Inc., San Jose, Calif.

[21] Appl. No.: 09/169,304

[22] Filed: Oct. 8, 1998

[51] Int. Cl.[7] .............................. H02M 7/00; G05F 3/16; G05F 3/04

[52] U.S. Cl. .............................. 363/73; 323/315; 323/313; 323/300

[58] Field of Search .............................. 363/73; 323/315, 323/313, 300

[56] References Cited

U.S. PATENT DOCUMENTS

| | | | |
|---|---|---|---|
| 5,459,653 | 10/1995 | Seto et al. | 363/73 |
| 5,619,125 | 4/1997 | Lakshmikumar | 363/73 |
| 5,754,039 | 5/1998 | Nishimura | 363/73 |
| 5,815,390 | 9/1998 | Lakshmikumar | 363/73 |

*Primary Examiner*—Peter S. Wong
*Assistant Examiner*—Bao Q. Vu
*Attorney, Agent, or Firm*—Sabath & Truong; Bobby K. Truong

[57] ABSTRACT

A voltage to current (V-I) converter includes a low pass filter, a first converting element, a second converting element, and an output. The low pass filter receives an input voltage signal and outputs a filtered voltage signal. The output of the low pass filter is fed to the first converting element, which converts the filtered voltage signal into a corresponding output current which is fed to the output of the V-I converter. Preferably, the voltage to current gain of the first converting element is high. The low pass filter and the first converting element form a low frequency or DC signal path. The V-I converter further includes a second converting element, which receives the input voltage signal and converts it into a corresponding output current which is also fed to the output of the V-I converter. This current is combined with the output current from the first converting element to produce an overall output current. Preferably, the second converting element has a substantially flat frequency response and a low voltage to current gain relative to the voltage to current gain of the first converting element. The second converting element forms the high frequency or alternating current (AC) signal path. By implementing a high gain on the low frequency path and a low gain on the high frequency path, the high frequency noise components are insignificant relative to the low frequency components. Thus, a relatively mall input voltage range is converted into a relatively large output current range without suffering increased sensitivity to noise.

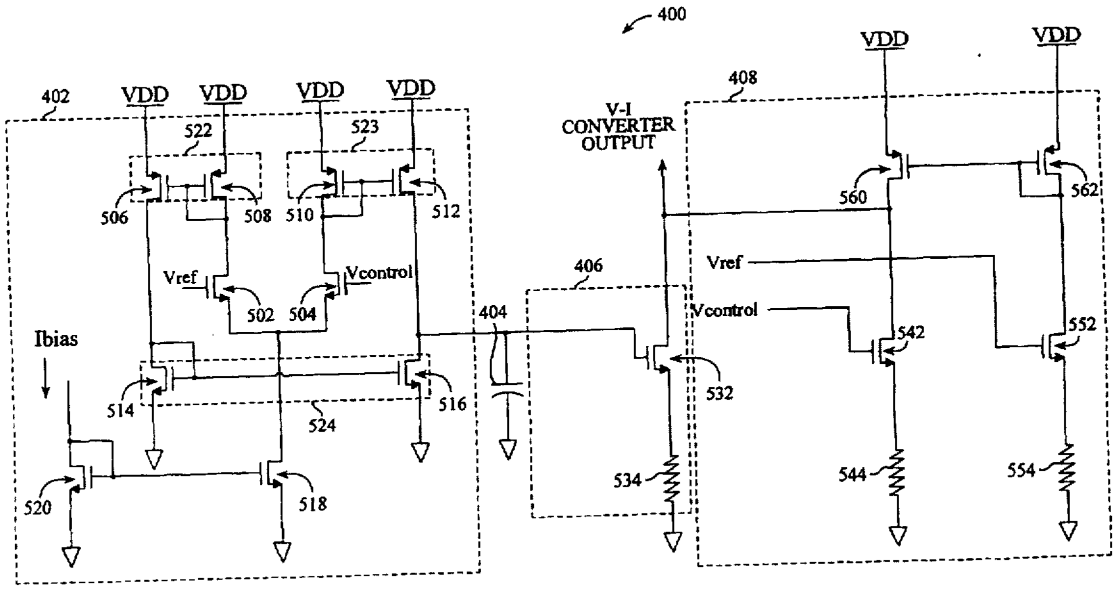

18 Claims, 9 Drawing Sheets